United States Patent [19]

Miller et al.

[11] Patent Number: 4,464,596
[45] Date of Patent: Aug. 7, 1984

[54] MULTI-SECTION PERMANENT MAGNET ROTOR

[75] Inventors: Timothy J. E. Miller, Schenectady; Donald W. Jones, Burnt Hills; Eike Richter, Scotia; Gary L. Kalan, Clifton Park, all of N.Y.

[73] Assignee: General Electric Company, Schenectady, N.Y.

[21] Appl. No.: 536,607

[22] Filed: Sep. 28, 1983

Related U.S. Application Data

[63] Continuation-in-part of Ser. No. 453,665, Sep. 27, 1982, abandoned.

[51] Int. Cl.³ ............................................. H02K 21/12
[52] U.S. Cl. ........................................ 310/156; 310/26

[58] Field of Search ............... 310/156, 154, 261, 262, 310/264, 265, 216-218

[56] References Cited

U.S. PATENT DOCUMENTS

| | | | |
|---|---|---|---|
| 2,418,980 | 4/1947 | Morrill | 310/156 |
| 2,564,320 | 3/1951 | Brainard | 310/156 X |
| 2,985,779 | 5/1961 | Flaningam et al. | 310/156 |
| 3,492,520 | 1/1970 | Yates | 310/156 X |
| 3,567,974 | 3/1971 | Spingler | 310/156 X |

Primary Examiner—Mark O. Budd
Attorney, Agent, or Firm—William H. Steinberg; James C. Davis, Jr.; Marvin Snyder

[57] ABSTRACT

A permanent magnet rotor uses a magnetic shaft having a rhomboidal cross section. Fastening means secure clamp pieces which in turn retain pole pieces and the permanent magnets.

18 Claims, 10 Drawing Figures

MULTI-SECTION PERMANENT MAGNET ROTOR

This is a continuation-in-part of application Ser. No. 453,665, filed Sept. 27, 1982, now abandoned.

BACKGROUND OF THE INVENTION

This invention relates to permanent magnet dynamoelectric machines and more specifically to permanent magnet dynamoelectric machine rotors with the permanent magnets located in the interior of the rotor.

Electric generators of alternating current are sometimes excited or magnetized by means of permanent magnets because this leads to machines of simple, rugged construction having high efficiency and being free of slip rings or commutators.

It is important to obtain a sufficiently strong magnetic field in the air gap of the machine. However, it is often necessary to use permanent magnets whose optimum field strength is different from the field strength required in the air gap. Optimum field strength is the field strength in the magnet which maximizes the stored magnetic energy per unit volume in the magnet and which therefore leads to a design in which magnet volume, weight and cost are minimized.

In addition to obtaining optimum field strength, there is a problem of how to mechanically support the permanent magnets located in the interior of the rotor. The magnets, as well as the surrounding structures are subjected to various forces such as those arising from thermal expansion and rotation, and residual forces from the manufacturing process, such as distortions from welding.

In previous high peripheral speed permanent magnet rotor designs such as the one shown in Richter U.S. Pat. No. 4,117,360, issued Sept. 26, 1978 and assigned to the instant assignee, a composite shrink ring of magnetic and nonmagnetic pieces welded together is used to hold the magnets and the remaining rotor assembly. The pole pieces in the rotor assembly are solid pieces of magnetic material.

It is an object of the present invention to provide a rotor for a permanent magnet machine in which the magnets may be easily inserted.

It is a still further object of the present invention to provide a rotor for a permanent magnet machine in which high precision assembly is achieved with minimum thermal distortion from welding or brazing.

It is a still further object of the present invention to provide a two pole rotor for a permanent magnet machine which maximizes the stored magnetic energy, minimizing magnet volume, weight and cost.

It is another object of the present invention to provide a rotor with a central through-shaft.

It is yet another object of the present invention to provide a rotor with laminated pole pieces for a permanent magnet machine, which is suitable for use in large diameter high speed machines.

SUMMARY OF THE INVENTION

In one aspect of the present invention a rotor for a permanent magnet machine is provided having a north and south arcuately shaped pole piece. A shaft of magnetic material having a central portion of substantially rhombic cross section is positioned with one corner adjacent the north pole piece and the diagonally opposite corner adjacent the south pole piece. The major sides of the shaft central portion and the inner faces of said pole pieces define the thickness in the radial direction of four apertures extending the axial length of the pole pieces. Magnets are positioned in each of the four apertures. Two of the magnets have their north seeking face adjacent the north pole piece and two of the magnets have their south seeking face adjacent the south pole piece. An arcuately shaped clamp piece is situated between the north and south pole pieces, on each end thereof, forming a cylinder. Bolt means extend through the clamp pieces into threaded holes formed in diagonally opposite corners of the central portion of the shaft. The clamp pieces have inclined surfaces which engage matching surfaces on the pole pieces to force the pole pieces toward the central portion of the shaft and thereby apply compressive force to the magnets when the bolt means are tightened.

In another aspect of the present invention a rotor for a permanent magnet machine is provided having a north and a south arcuately shaped pole piece. A first nonmagnetic insert is secured centrally on the interior portion of the north pole piece. A second nonmagnetic insert is secured centrally on the interior portion of the south pole piece. A first nonmagnetic segment is secured between one end of the north pole piece and one end of the south pole piece. A second nonmagnetic segment is secured between the other end of the north pole piece and the other end of the south pole piece forming a hollow cylinder. A shaft of magnetic material having a central portion of substantially rhombic cross section, is positioned in the hollow cylinder. One pair of diagonally opposite corners of the shaft is positioned adjacent the two nonmagnetic inserts and the other pair of diagonally opposite corners are positioned adjacent to the nonmagnetic segments. The major sides of the shaft and the faces of the pole pieces define the thickness in the radial direction of four apertures extending the axial length of the pole pieces. Permanent magnets are positioned in each of the apertures. Two of the magnets have their north seeking face adjacent the north pole piece and two of the magnets have their south seeking face adjacent the south pole piece. The adjacent ends of the first and second magnets are separated from one another by one of the central nonmagnetic inserts. The adjacent ends of the third and fourth magnets are separated from one another by the other one of the central nonmagnetic inserts. The adjacent ends of the fourth and first magnets are separated from one another by the other of the central nonmagnetic inserts.

DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

DETAILED DESCRIPTION OF THE INVENTION

Figure 1:
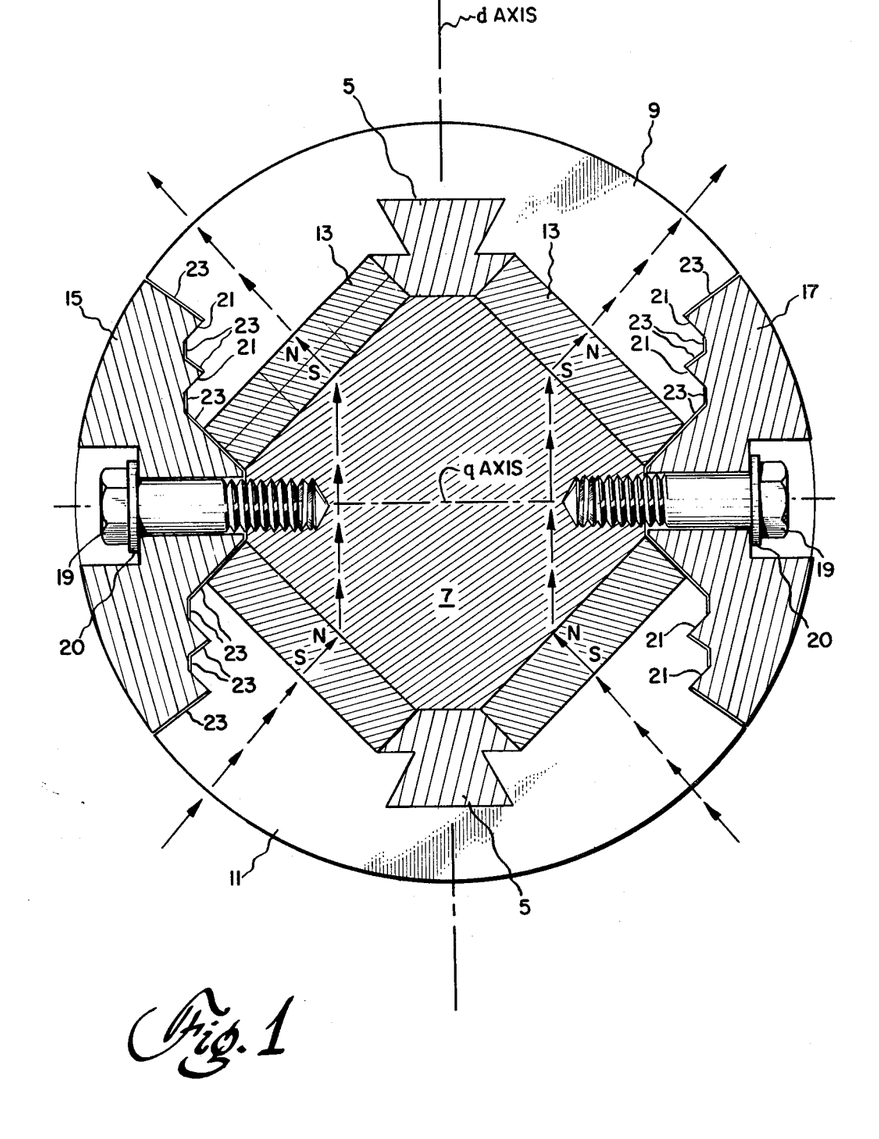
FIG. 1 is a sectional view of one embodiment of a permanent magnet rotor in accordance with the present invention.

Referring now to the drawing in which like reference numerals indicate like elements throughout and in particular to FIG. 1 thereof, there is shown a two pole permanent magnet rotor suitable for use as a rotor for a motor or generator. Nonmagnetic keys 5, made from stainless steel, for example, are welded to diagonally opposite corners of the central portion of the substantially rhombic cross section of a shaft 7 of magnetic material. The shaft shown in the embodiment of FIG. 1 is substantially square shaped in cross section. The keys 5 have a flared or dovetail tenon shape. An arcuately shaped north pole piece 9 having a dovetail mortise corresponding to the dovetail tenon is slid in the axial direction over one key 5. Similarly, an arcuately shaped south pole piece 11 having a dovetail mortise corresponding to the dovetail tenon shape of key 5 is slid in the axial direction over the other key 5. The pole pieces are made up of a stack of laminated magnetic steel sheets. The plane of the laminations is parallel to the section line 1—1 in FIG. 2. The pole piece laminations are insulated from one another to minimize power losses and heating caused by tooth-ripple flux pulsations. The laminations can be insulated from one another by magnetic oxide formed, for example, by steam blueing.

Permanent magnets 13 are slid into apertures running the axial length of the stack formed between the inner faces of pole pieces 9 and 11 and the sides of the square central portion of the shaft 7. The magnets positioned in each slot can be made up of smaller magnets epoxied together. Two magnets are positioned with their north seeking face adjacent the north pole piece 9 and two magnets are positioned with their south seeking face adjacent the south pole piece 11. Clamp pieces 15 and 17 are positioned on either side of the rotor to force the north and south pole pieces toward the shaft and thereby apply compressive force to the magnets. The clamp pieces 15 and 17 are drawn toward the center of the rotor by bolts 19, preferably nonmagnetic, which extend along the quadrature axis through apertures in the clamp pieces which communicate with threaded holes in the shaft. The clamp pieces have inclined surfaces which engage corresponding inclined surfaces on the pole pieces which force the pole pieces towards the shaft when the bolts 19 are tightened. The inclined surfaces 21 form an acute angle with the quadrature or q axis, which concides with the direction of bolt travel during tightening. The quadrature axis is defined as the direction of the radial plane along which the permanent magnets produce no magnetization, and which normally coincides with the longitudinal plane midway between adjacent poles. The direct axis or d axis is defined as the direction of the plane of symmetry of the no-load magnetic-flux density, produced by the permanent magnets, normally coinciding with the longitudinal plane of symmetry of a field pole.

During assembly, after the keys 5 have been welded to the shaft, the pole pieces are slid over the keys 5, the magnets are slid into their apertures, and the clamps are positioned on either side of the rotor. The keys 5 are nonmagnetic to avoid short-circuiting the magnetic flux around the ends of the magnets. The clearance between the inclined surface 21 of the clamps 15 and the corresponding pole piece inclined surfaces should be zero. The other surfaces 23 of the clamp should have a clearance (10 mils, for example) between the clamp surfaces 23 and the corresponding pole piece surfaces. The clearance is reduced or eliminated as the bolts 19 are tightened to a high torque, typically up to 85% of the yield strength, to force the pole pieces against the magnets which in turn are forced against the shaft.

Figure 2:
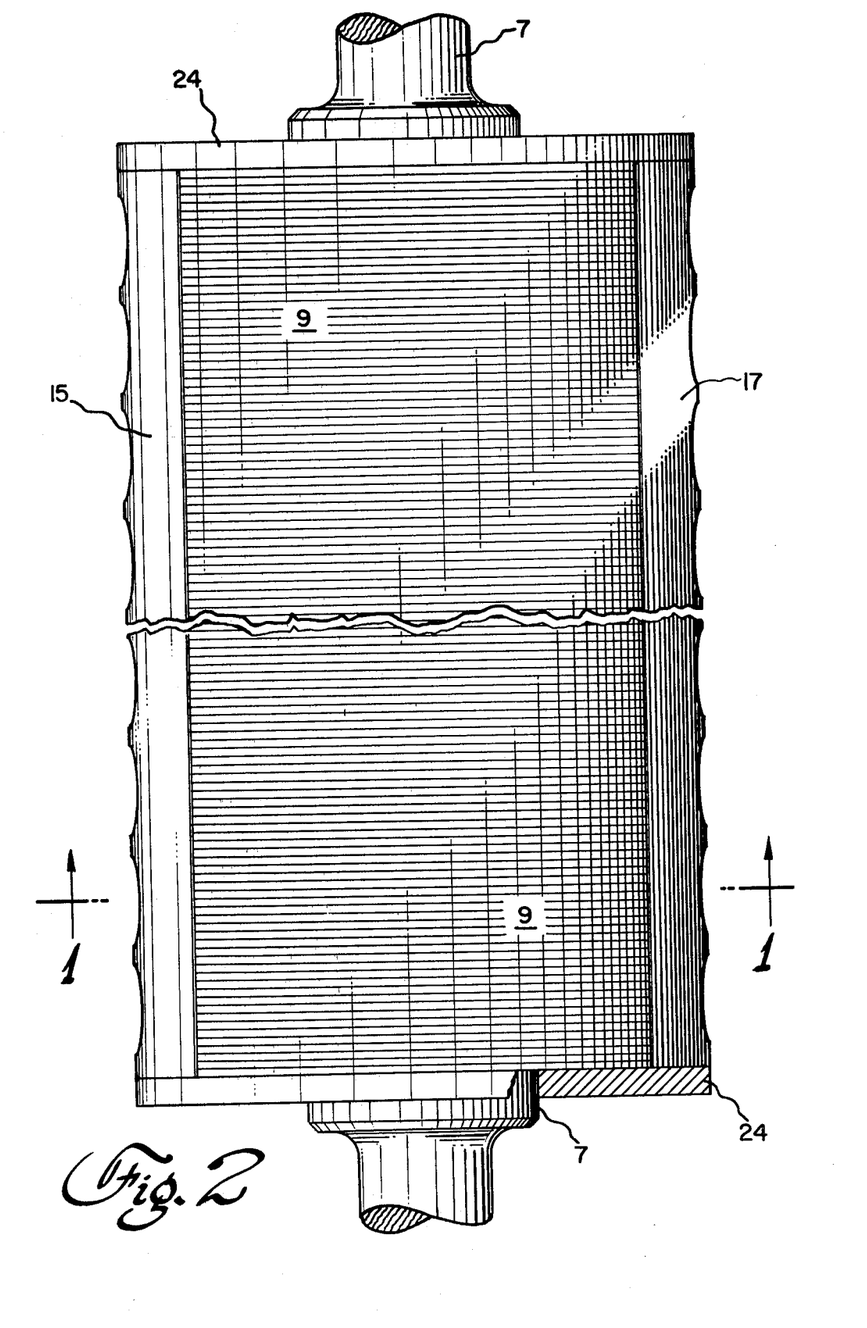
FIG. 2 is a side view of the permanent magnet rotor of FIG. 1 showing lines 1—1 along which the sectional view of FIG. 1 is taken.

Referring now to FIG. 2, a side view of the rotor of FIG. 1 is shown. An end ring 24 of nonmagnetic material such as aluminum is shown pressed on the shaft 7 on either end of the stack to cover the ends of the stack.

The embodiment shown in cross section in FIG. 1 allows a simplified integral pole piece to be used. The nonmagnetic key 5 is necessary to prevent a short circuit flux path between the north and south faces of each of the magnets. The key is welded to the shaft 7 to provide support for the central part of the pole piece against centrifugal forces. The clamps 15 and 17 have ramps or inclined surfaces 21 engaging matching surfaces on the edges of the pole pieces 9 and 11. When bolts 19, which are along the quadrature axis, are tightened the inclination of the engaging surfaces and the clearances between the surface 23 and the pole pieces are such that the pole pieces are drawn toward the shaft 7 and clamp the magnets 13 in compression to form a rigid structure.

The magnets 13 contribute to the structural strength of the rotor in the embodiment shown in cross section in FIG. 1. When the nonmagnetic keys 5 are used on the direct axis and clamps 13 on the quadrature axis, the rotor construction requires no welding between laminated magnetic parts and nonmagnetic solid parts.

In rotor operation, the rotor of FIG. 1 is positioned in the bore of a stator (not shown). The stator configuration is essentially the same as that for a three-phase induction motor stator for three-phase operation. The rotor and stator are assembled with a narrow air gap between the exterior radial surface of the rotor and the interior surface of the stator (typically $\frac{1}{8}''$). The air gap is somewhat larger than the air gap of an induction motor but smaller than that in the normal synchronous machine with wound rotor. A few typical lines of flux are shown by dashed lines in FIG. 1. Optimum field strength in the preferred embodiment is achieved with a flux concentration (ratio of magnet pole area to rotor pole area at the rotor surface) of less than one. Flux concentration is achieved by orienting the magnet pole faces obliquely to the desired direction of magnetic flux. The ratio of magnet area to pole area has been chosen to be the highest value which is consistent with manufacturing and structural constraints to maximize the stored magnetic energy per unit volume in the magnet. Because of the flux concentration arrangement the total pole area of the magnet is a large fraction of the pole area at the rotor surface, so that the flux density in the air gap between the rotor and stator (not shown) is not much less than the flux density in the magnets themselves. Each flux line passes through two magnet blocks 13 in series, which illustrates the fact that the total magnet length in the direction of magnetization is twice the thickness of one magnet block. The total width of a magnet pole communicating flux to one pole at the rotor surface is twice the width of one block. The width of a block 13 shown in FIG. 1, for example, is about four times its magnetic length, as is typical with high-energy magnets with high coercivity (such as samarium cobalt or other rare-earth/cobalt magnets).

Figure 3:
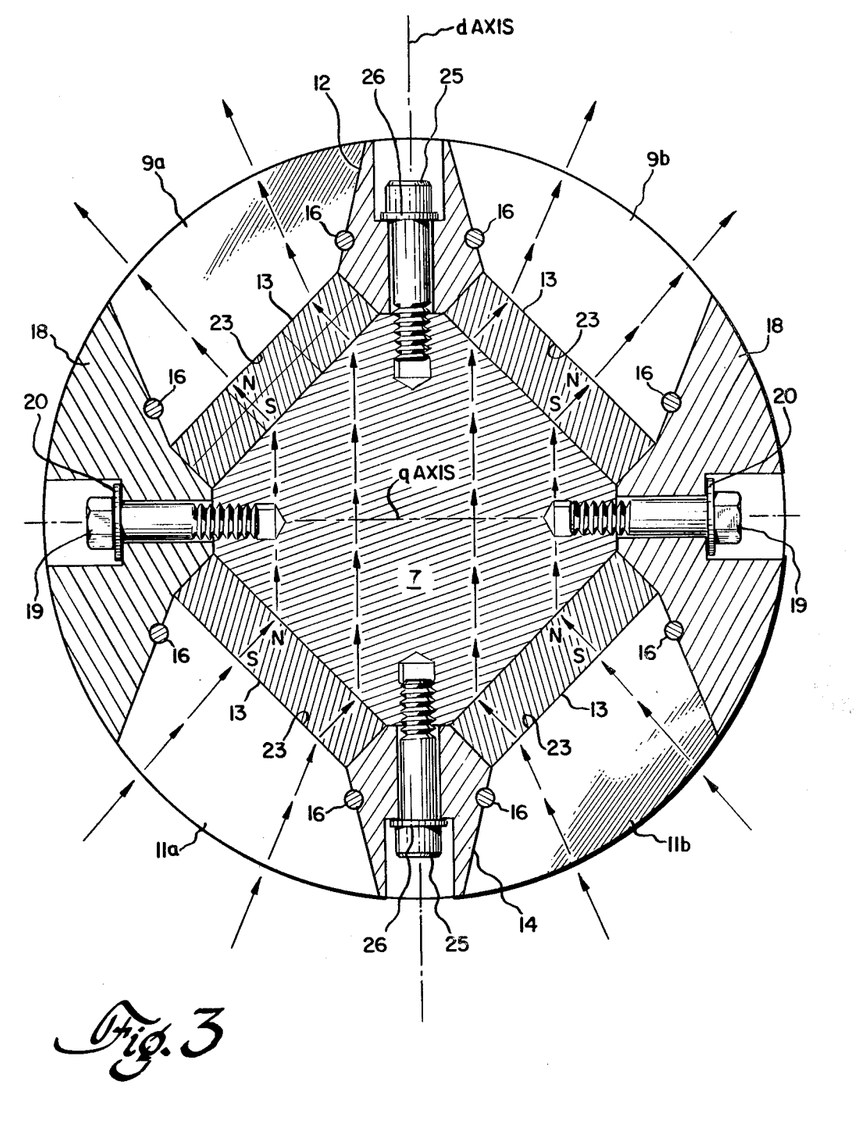
FIG. 3 is a sectional view of another embodiment of a permanent magnet rotor having radial bolts along the d and q axis in accordance with the present invention.

Referring now to FIG. 3, a two pole permanent magnet rotor, suitable for use as a rotor for a motor or generator, comprises an arcuately shaped north pole piece having two sections 9a and 9b and an arcuately shaped south pole piece having two sections 11a and 11b. The pole piece sections comprise a stack of laminated magnetic steel sheets. The plane of the laminations is parallel to the section line 3—3 of FIG. 4. The pole piece laminations are insulated from one another to minimize power losses and heating caused by tooth-ripple flux pulsations. The laminations can be insulated from one another by magnetic oxide formed, for example, by steam blueing. The north pole piece sections are separated by and secured to a central nonmagnetic insert 12. One end of each of the laminated pole pieces 9a and 9b is preferably electron beam welded to the central nonmagnetic insert 12 which can be a solid piece of austenitic stainless steel. Similarly, one end of each of the south pole piece sections 11a and 11b is preferably electron beam welded to a central nonmagnetic insert 14. Alternatively, the north and south pole pieces can each be a single section with the nonmagnetic inserts centrally located on the interior portion of the pole pieces. Electron beam weld stops 16 of low carbon steel or stainless steel may be used to control the depth of the electron beam weld and reduce stresses caused by the end of the weld. For additional details concerning the use of electron beam weld stops, reference should be made to Jones et al. copending application "Method of Electron Beam Welding" filed Dec. 27, 1982, Ser. No. 453,664 and assigned to the same assignee as the present invention. The above copending application is hereby incorporated by reference. Alternatively, the laminated pole pieces can be secured to the nonmagnetic inserts by other methods such as brazing.

Figure 6:
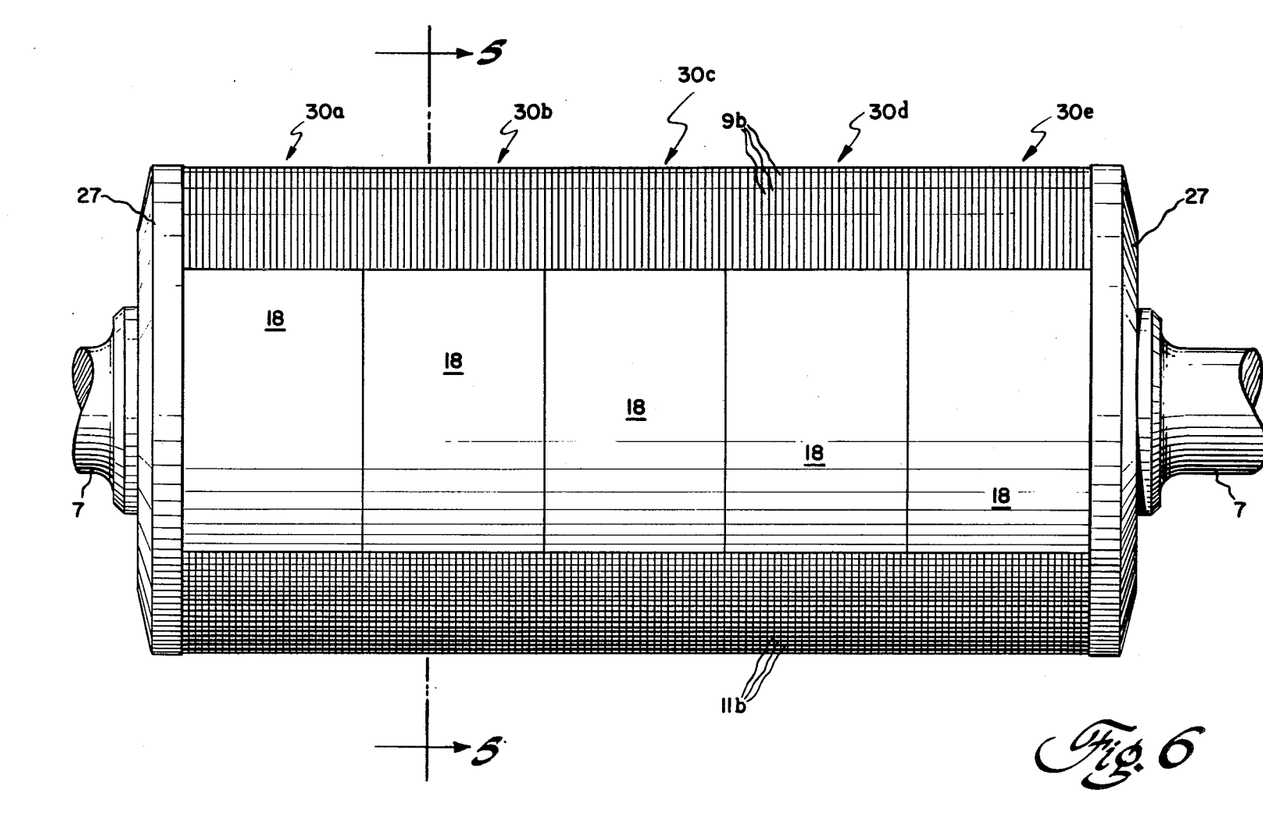
FIG. 6 is a side view of the permanent magnet rotor of FIG. 5, showing lines 5—5 along which the sectional view of FIG. 5 is taken.

Secured between north pole piece section 9a and south pole piece section 11a is a nonmagnetic segment or cheek piece 18, and secured between north pole piece sections 9b and 11b is a nonmagnetic segment 18. The nonmagnetic segments preferably are of solid or laminated austenitic stainless steel and are preferably electron beam welded to the laminated pole piece sections, with weld stops 16 used to terminate and control the depth of the weld. Alternatively, the laminated pole pieces can be secured to the nonmagnetic inserts and nonmagnetic segments by other methods such as brazing, arc welding or tungsten inert gas welding. The welding of the pole piece section to the nonmagnetic inserts and nonmagnetic segments can alternatively be performed in the axial direction on short axial lengths or subassemblies shown, for example, in FIG. 6, with the nonmagnetic segment 18 divided into five sections, 30a, 30b, 30c, 30d and 30e. The welds can be performed axially inward on both faces of the subassemblies with the welds joining in the center. The weld stops 16, shown in FIG. 3, can be used as starter strips when the welds are performed axially. The short axial length subassemblies can be stacked to form the desired stack length. A shaft of magnetic material 7, with a central portion substantially rhombic in cross section (shown as a substantially square shaft in the present embodiment) is interference fit in the aperture formed by the ring of pole pieces, nonmagnetic segments and central inserts. The inner faces of the pole piece sections and the major faces of the central portion of the shaft form four apertures 23. Bolts 25, preferably of nonmagnetic material such as austenitic stainless steel, extend through holes formed in the central insert and into threaded holes in diagonally opposite corners of the substantially square central portion of the shaft. The bolts are tightened to a high torque typically up to 85% of their yield strength. Bolts 19, preferably of nonmagnetic material, extend through holes in the nonmagnetic segment into threaded holes in diagonally opposite corners of the substantially square central portion of the shaft 7. Magnetized permanent magnets 13 are slid into the apertures 23. The permanent magnets are oriented so that two magnets have their north seeking face adjacent each of the north pole piece sections and the other two magnets have their south seeking faces adjacent the south pole piece section. The rotor can then be epoxy impregnated to help secure the magnets in a fixed position.

The rotor shown in FIG. 3 does not rely on the magnets 13 for structural support. The welded pole pieces 9a, 9b, 11 and 11b, central nonmagnetic inserts 12 and 14 and nonmagnetic segments 18 form a rigid ring or hollow cylinder structure. The hollow cylinder is bolted along the d and q axes to the rotor shaft 7. The embodiment of FIG. 3 is suitable for higher peripheral speeds than the embodiment of FIG. 1, and can be used in manufacturing larger diameter high speed machines (diameter up to about 15 inches at 3600 rpm).

The central nonmagnetic inserts 12 and 14 form a "flux barrier" between the pole piece sections 9a and 9b, and 11a and 11b, respectively. The barrier greatly reduces the flux traversing the rotor in a direction generally parallel to the quadrature axis. The quadrature or "cross pole" flux, if not greatly reduced by the central nonmagnetic inserts 12 and 14, could otherwise lead to a reduction in the electrical capability of the machine. The central nonmagnetic inserts also prevent a short circuit path between the north and south faces of each of the magnets.

In rotor operation, the rotor of FIG. 3 is positioned in the bore of a stator (not shown). A few typical lines of flux are shown by the dashed lines in FIG. 3. Because of the flux concentration arrangement the total pole area of the magnet is not much less than the pole area at the rotor surface, so that the flux density in the air gap between the rotor and stator (not shown) is not much less than the flux density in the magnets themselves, as is also true of the rotor shown in FIG. 1. The direction of magnetization in the rotor shown in FIG. 3 is such that a two-pole rotor results. Each flux line passes through two magnet blocks 13 in series, which illustrates the fact that the total magnet length in the direction of magnetization is twice the thickness of one magnet block. The total width of a magnet pole communicating flux to one pole at the rotor surface is twice the width of one block. The width of a magnet block shown in FIG. 3 is about four times its thickness, as is typical with high-energy magnets with high coercivity (such as rare-earth/cobalt magnets).

Figure 4:
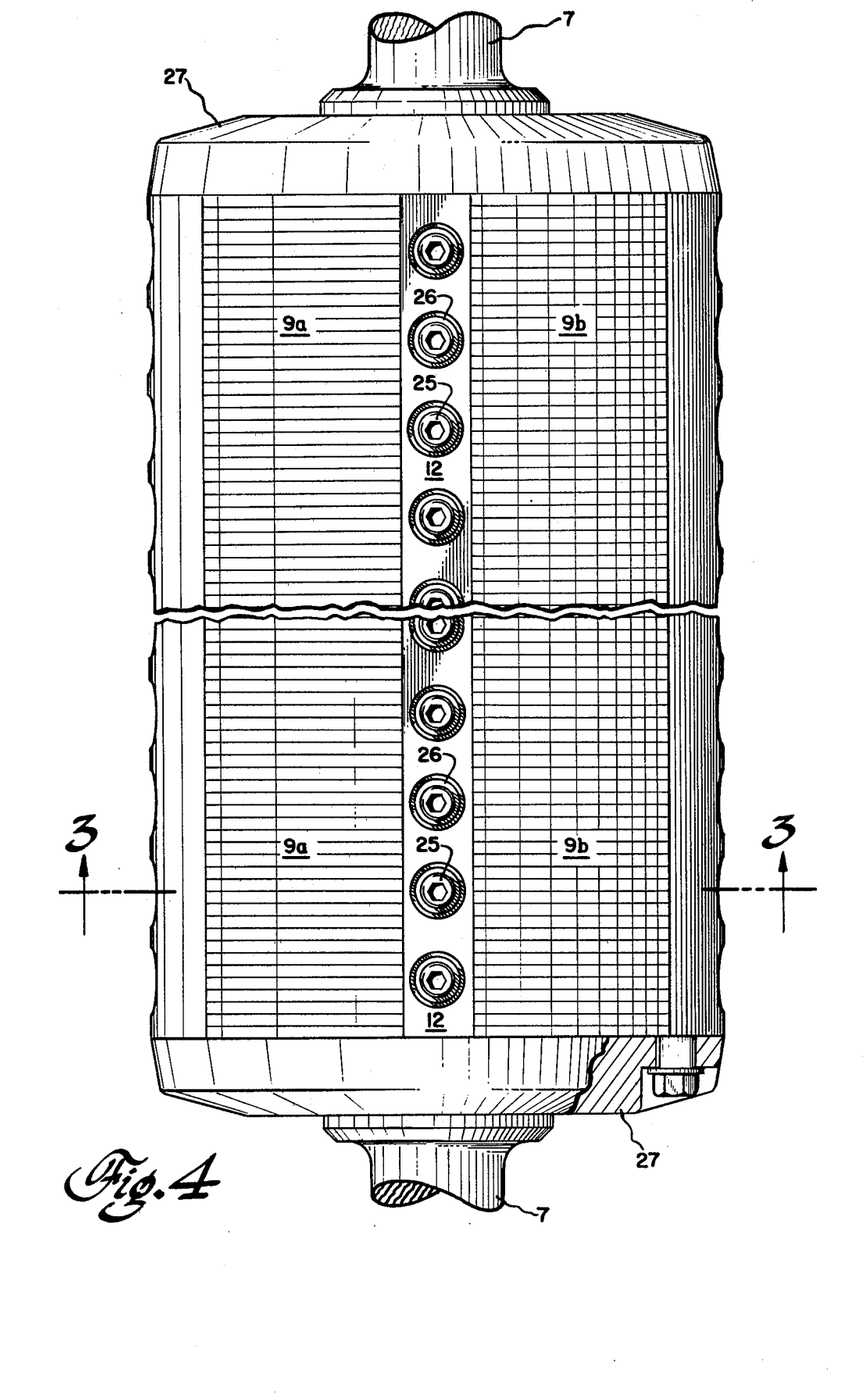
FIG. 4 is a side view of the permanent magnet rotor of FIG. 3, showing lines 3—3 along which the sectional view of FIG. 3 is taken.

Referring now to FIG. 4, a side view of the rotor of FIG. 3 is shown. An end ring 27 of nonmagnetic material such as aluminum is shown pressed on the shaft 7 and bolted to the nonmagnetic segments on either end of the stack to hold the magnets 13 (shown in FIG. 3) in their apertures.

Figure 5:
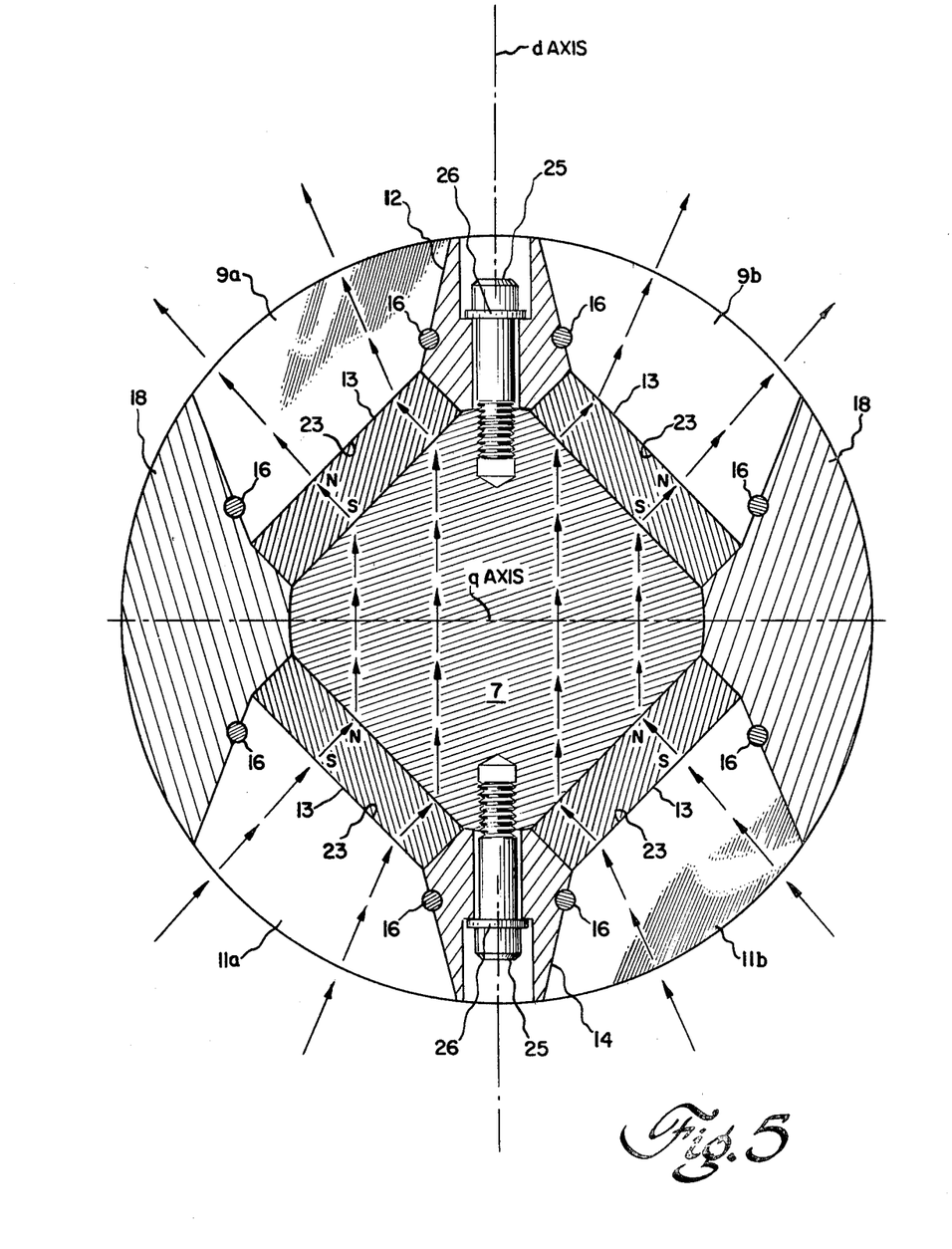
FIG. 5 is a sectional view of another embodiment of a permanent magnet rotor having radially extending bolts along the d-axis in accordance with the present invention.

Referring now to FIG. 5, a rotor having bolts 25 extending radially inward along the d-axis is shown. The rotor of FIG. 5 is the same as the rotor of FIG. 3, except radially extending bolts are not used along the q-axis, the nonmagnetic segments 18 are not secured to the shaft 7 and, as can be seen in the side view of the rotor in FIG. 6, the rotor comprises subassemblies 30a, 30b, 30c, 30d and 30e which are each formed by axial welding inwardly from the two cylinder faces. Radial welding to form the hollow cylinder can alternatively be used.

Figure 7:
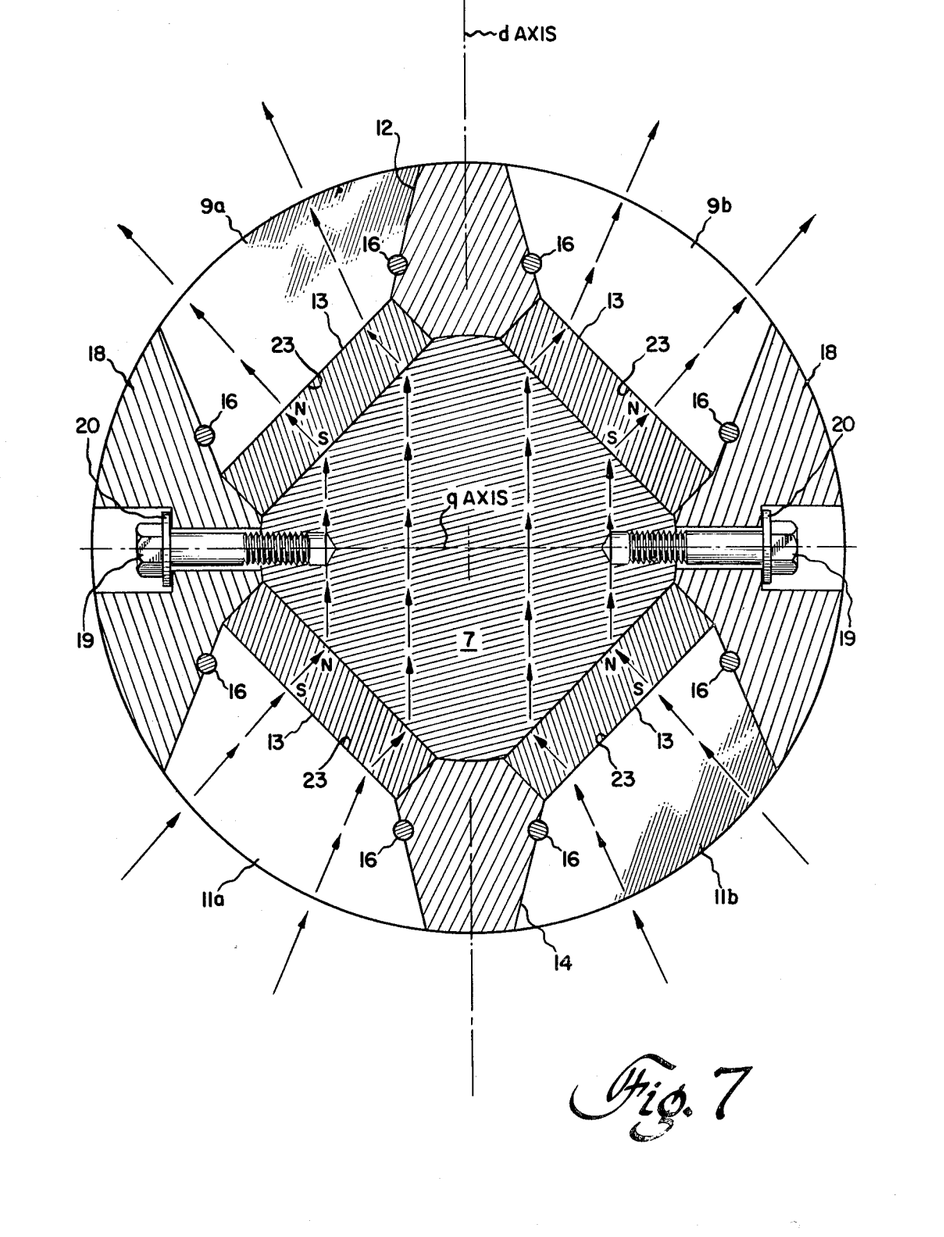
FIG. 7 is a sectional view of another embodiment of a permanent magnet rotor having radially extending bolts along the q-axis in accordance with the present invention.
Figure 8:
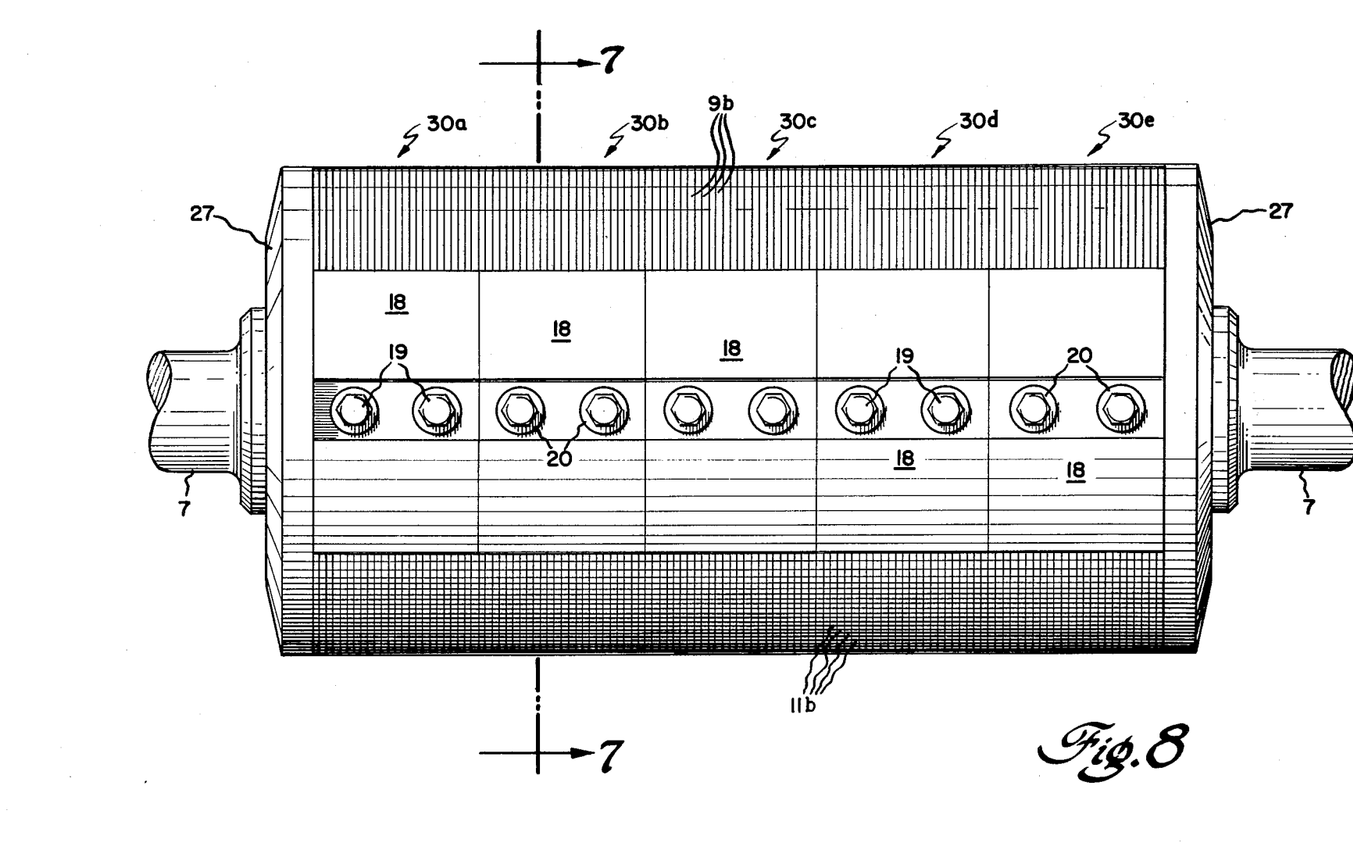
FIG. 8 is a side view of the permanent magnet rotor of FIG. 7, showing lines 7—7 along which the sectional view of FIG. 7 is taken.

Referring now to FIG. 7, a rotor having bolts 19 extending radially inward along the q-axis is shown. The rotor of FIG. 7 is the same as the rotor of FIG. 5 except the radial bolts extend radially inward along the q-axis rather than the d-axis. The side view of the rotor in FIG. 8 shows subassemblies as in FIG. 6, although the rotor could be constructed without subassemblies using radial welding, for example, as explained in connection with FIG. 3.

Figure 9:
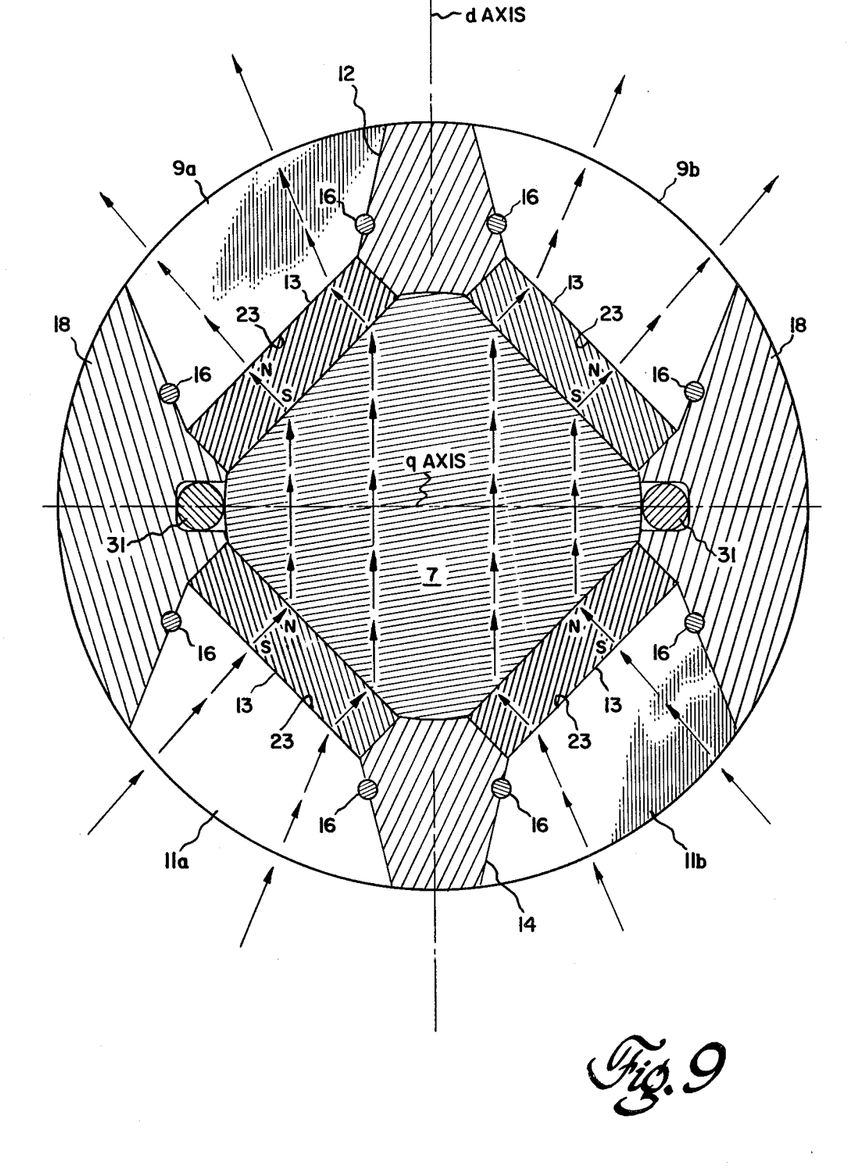
FIG. 9 is a sectional view of another embodiment of a permanent magnet rotor without radially extending bolts in accordance with the present invention.
Figure 10:
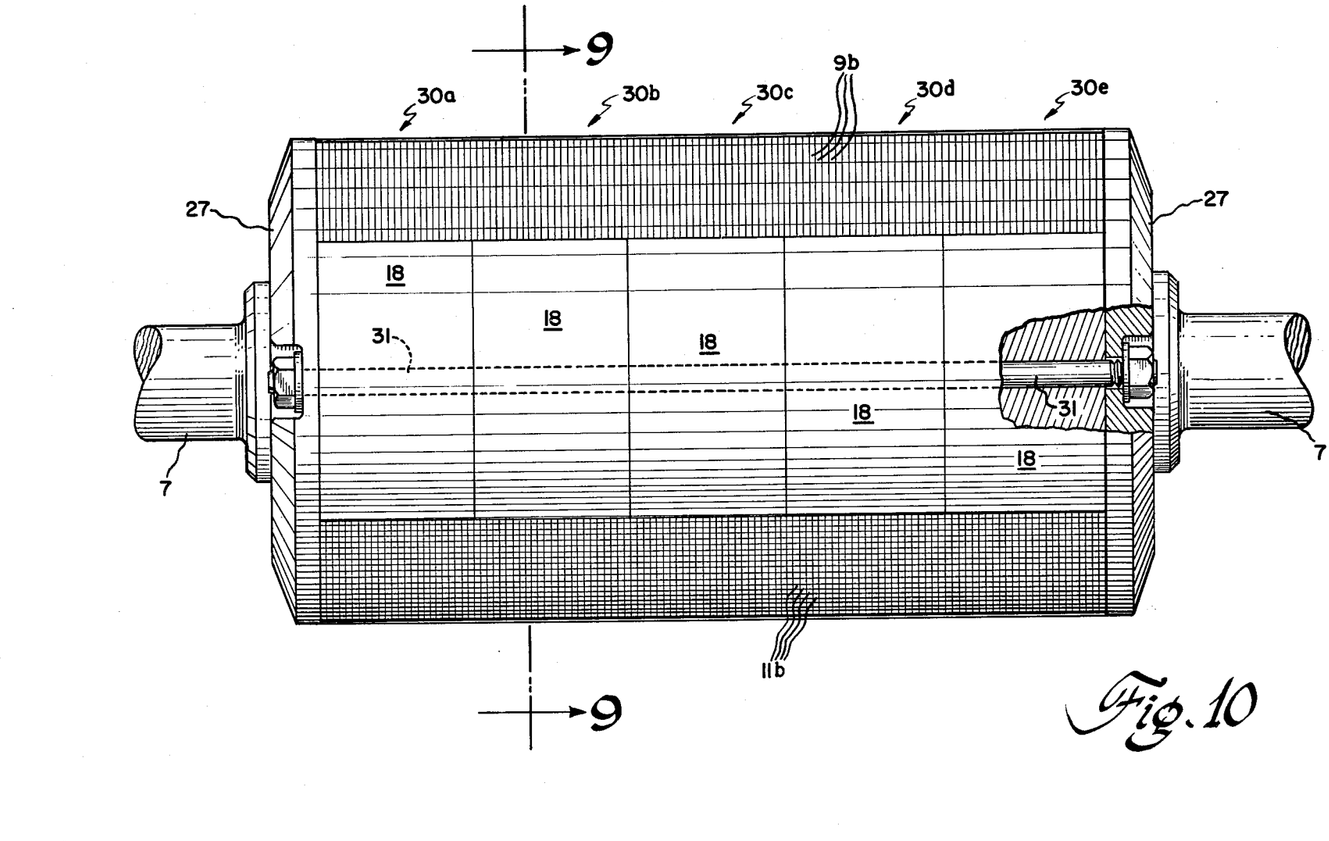
FIG. 10 is a side view of the permanent magnet rotor of FIG. 9, showing lines 9—9 along which the sectional view of FIG. 9 is taken.

The rotor shown in FIG. 9 does not have radially extending bolts securing the nonmagnetic inserts 12 and 14 and nonmagnetic segments 18 to the shaft 7. The hollow cylinder is secured together as previously described in connection with FIG. 3. The shaft 7 is interference fitted in the hollow cylinder formed of pole pieces 9a, 9b, 11a, 11b, nonmagnetic segments 18 and nonmagnetic inserts 12 and 14 such as by shrink fitting. Axially extending bolts 31 located in apertures formed in nonmagnetic segments 18 on either side of the shaft 7 pass through the axial length of the rotor and hold the end plates 27 in position, keeping the magnet 13 in these apertures.

The operation of the rotors of FIGS. 5, 7 and 9 is similar to that of the rotor of FIG. 3.

The foregoing describes a rotor for a permanent magnet machine, in which high-precision assembly is achieved without thermal distortion from welding or brazing and the permanent magnets can be easily inserted in the rotor during assembly.

While the invention has been particularly shown and described with reference to several preferred embodiments thereof, it will be understood by those skilled in the art that various changes in form and detail may be made without departing from the spirit and scope of the invention.

What is claimed is:

1. A rotor for a permanent magnet machine comprising:
   a north and a south arcuate shaped pole piece;
   a shaft of magnetic material having a central portion with a substantially rhombic cross section, said north pole piece positioned adjacent one corner of said substantially rhombic central portion of said shaft and said south pole positioned adjacent a diagonally opposite corner of said shaft central portion, the major sides of said shaft central portion and the inner faces of said pole piece, defining the thickness in the radial direction of four apertures extending the axial length of the pole pieces;
   four magnets, each magnet positioned in one of said apertures, respectively, two of said magnets each having its north seeking face adjacent the north pole piece and two of said magnets each having its south seeking face adjacent the south pole piece;
   two arcuate shaped clamp pieces, each of said clamp pieces located between the north and south pole pieces and positioned to form a cylinder with said pole pieces; and
   fastening means extending through said clamp pieces into holes formed in diagonally opposite corners of said central portion of the shaft, said clamp pieces having inclined surfaces engaging matching surfaces on said pole pieces to force said pole pieces toward said central portion of said shaft and thereby apply compressive force on said magnets when said fastening means are tightened.

2. The rotor of claim 1 further comprising
   nonmagnetic flared keys positioned in an aperture formed in each of said pole pieces, respectively, said keys secured to a diagonally opposite corner, respectively, of said central shaft.

3. The rotor of claim 1 wherein the inclined surfaces of each of said arcuate shaped clamp pieces form an acute angle with the quadrature flux axis extending in the direction of movement of said fastening means during tightening, said inclined surfaces contacting mating surfaces on said pole pieces thereby causing said pole pieces to be forced toward said shaft when said fastening means are tightened.

4. The rotor of claim 1 wherein said fastening means are nonmagnetic.

5. The rotor of claim 1 wherein each of said pole pieces comprises a stack of laminations, respectively, each of said laminations being perpendicular to the axial direction of said rotor.

6. The rotor of claim 1 wherein each of said keys is secured to said shaft by a weld.

7. A rotor for a permanent magnet machine comprising:
   a north and a south arcuate shaped pole piece,
   two nonmagnetic inserts, one of said inserts being secured centrally on the interior portion of said north pole piece and the other of said inserts being secured centrally on the interior portion of said south pole piece;
   two nonmagnetic segments, one of said segments secured between one end of said north pole piece and one end of said south pole piece, the other of said segments secured between the other end of said south pole piece and the other end of said north pole piece, the segments and pole pieces thereby forming a hollow cylinder;
   a shaft of magnetic material having a central portion of substantially rhombic cross section, said shaft positioned in said hollow cylinder, one pair of diagonally opposite corners of the shaft being positioned adjacent said two nonmagnetic inserts, respectively, the other pair of diagonally opposite corners of the shaft positioned adjacent said nonmagnetic segments, respectively, the major sides of said shaft and the inner faces of said pole pieces defining the thickness in the radial direction of four apertures extending the axial length of the pole pieces;

four permanent magnets, each of said magnets positioned in one of said apertures, respectively, first and second ones of the magnets each having its north seeking face adjacent said north pole piece and the third and fourth ones of the magnets each having its south seeking face adjacent said south pole piece, the adjacent ends of said first and second magnets being separated from one another by one of said central nonmagnetic inserts, the adjacent ends of said third and fourth magnets being separated from one another by the other of said central nonmagnetic insert, the adjacent ends of said first and fourth magnets being separated from one another by one of said nonmagnetic segments, and the adjacent ends of said second and third magnets being separated from one another by the other of said nonmagnetic segments, respectively; and means securing said magnets in said apertures.

8. The rotor of claim 7 wherein said shaft is interference fit in said hollow cylinder.

9. The rotor of claim 7 wherein said north and south pole pieces each comprises two sections separated by and secured to one of said nonmagnetic inserts, respectively.

10. The rotor of claim 7 further comprising:
means securing said nonmagnetic inserts to said shaft.

11. The rotor of claim 7 including bolt means extending through a hole in each of said nonmagnetic insert respectively into a separate threaded hole, respectively, formed in said shaft.

12. The rotor of claim 11 further comprising:
means securing said nonmagnetic segments to said shaft.

13. The rotor of claim 12 including bolt means extending through a hole in each of said nonmagnetic segments, respectively, into a separate, additional threaded hole, respectively, formed in said shaft.

14. The rotor of claim 9 wherein each of said pole piece sections comprises a stack of laminations, the plane of said laminations being perpendicular to the axial direction of said rotor.

15. The rotor of claim 14 wherein said central nonmagnetic inserts and said nonmagnetic segments are secured to said laminated pole pieces by electron beam welds.

16. The rotor of claim 7 wherein said means securing said magnets in said apertures comprises an end ring positioned on either end, respectively, of said stack of laminations and secured to a nonmagnetic portion of said rotor.

17. The rotor of claim 11 wherein said bolt means is nonmagnetic.

18. The rotor of claim 13 wherein said bolt means is nonmagnetic.

* * * * *